United States Patent [19]
Strobbe

[11] Patent Number: 5,339,559
[45] Date of Patent: Aug. 23, 1994

[54] FISHING JIG

[76] Inventor: Steven Strobbe, 4916 Caney Ct., Port Richey, Fla. 34668

[21] Appl. No.: 169,155

[22] Filed: Dec. 20, 1993

[51] Int. Cl.$^5$ .............................................. A01K 85/00
[52] U.S. Cl. .................................. 43/42.37; 43/42.28; 43/44.8
[58] Field of Search ................ 43/42.39, 42.43, 42.23, 43/42.28, 42.29, 44.2, 41, 42.37, 42.45, 43.6, 42.28, 44.4, 44.8, 44.81

[56] References Cited

U.S. PATENT DOCUMENTS

| | | | |
|---|---|---|---|
| 1,609,209 | 11/1926 | Schnell | 43/42.5 |
| 2,315,304 | 3/1943 | Upperman | 43/42.28 |
| 2,501,753 | 5/1950 | Ayers | 43/43.6 |
| 2,619,763 | 12/1952 | Siebert | 43/42.43 |
| 3,081,573 | 3/1963 | Mutti | 43/42.28 |
| 4,712,326 | 12/1987 | Hoover | 43/42.39 |
| 5,175,955 | 1/1993 | Wilson | 43/42.39 |

*Primary Examiner*—P. Austin Bradley
*Assistant Examiner*—James Miner
*Attorney, Agent, or Firm*—Dominik, Stein, Saccocio, Reese, Colitz & Van der Wall

[57] ABSTRACT

A fishing lure for improved securement of the bait to the hook comprising a hook of an essentially rigid material which has a central linear portion and a curved portion at the outboard free portion terminating in a barb at the free end and an upturned inboard portion terminating in a first eyelet. A head is formed of a material which has a specific gravity greater than water to allow, when coupled with the hook, the sinking thereof. The head is in an oval shaped configuration and covers that portion of the inboard and central portions of the hook where the inboard portion bends from the central portion. The first eyelet is located at the inboard end of the hook exterior of the head. A generally cylindrical extension extends outboardly from the head along a minor extent of the central portion of the hook. The outboard end of the cylindrical extension terminates in a radial projection to assist in maintaining the bait on the hook in contact with the cylindrical extension of the head. A supplemental eyelet is secured with respect to the head between the first eyelet and the cylindrical extension. An elastic member couples the second eyelet and the curved outboard portion of the hook. The elastic member extends in a line coupling the outboard most extent of the second eyelet and the outboard most extent of the curved portion of the hook.

11 Claims, 4 Drawing Sheets

FISHING JIG

BACKGROUND OF THE INVENTION

1. Field of the Invention

This invention relates to fishing lures for improved securement of bait to hook and, more particularly, to positioning an elastic member between a central portion of a fish hook and a supplemental eyelet on the head of the lure for ensuring that bait positioned on the hook does not inadvertently move from its intended position.

2. Description of the Background Art

Many types of devices are used today to assist fishermen. One such type of device includes a mechanism for ensuring that bait on a hook does not inadvertently slide from its intended position. If the bait does not remain in proper position on the hook, the chances for catching a fish will be diminished. Consequently, the chances for successful fishing will be increased with the ability to maintain the bait on the hook in a proper orientation.

Various devices have been proposed in the prior art for use in holding bait onto a hook. By way of example, consider U.S. Pat. No. 911,040 to Hickey, U.S. Pat. No. 719,704 to Trakel, U.S. Pat. No. 797,281 to Henzel, U.S. Pat. No. 2,828,573 to Larsen and U.S. Pat. No. 2,531,995 to Sweetman relate to fish hooks.

U.S. Pat. No. 2,863,378 to Walker, U.S. Pat. No. 3,868,784 to Sabol and U.S. Pat. No. 3,748,773 to Goforth relate to fishing lures.

U.S. Pat. No. 1,261,601 to Ore relates to a bait carrying attachment for fish hooks. U.S. Pat. No. 1,544,034 to Ratcliff relates to a weedless fishhook. U.S. Pat. No. 2,888,772 to Lawter relates to a bait impaling retainer for fishhooks. U.S. Pat. No. 2,955,378 to Burke relates to artificial fish lures. U.S. Pat. No. 3,169,338 to Morin relates to weedless fish hooks. U.S. Pat. No. 3,400,484 to Beard relates to a bait holder. U.S. Pat. No. 3,430,378 to Sweeney relates to a weight and bait holder for fishhooks. U.S. Pat. No. 3,465,466 to Showalter relates to a fishhook for artificial bait. U.S. Pat. No. 3,640,014 to Gurka relates to a fishhook with weed guard. U.S. Pat. No. 3,724,116 to Lindner et al relates to a fish hook for use with a plastic worm. U.S. Pat. No. 3,863,383 to Lore relates to a bait saver. U.S. Pat. No. 4,229,901 to Flowers et al relates to a fishing hook with encircling holder for live bait. U.S. Pat. No. 4,349,979 to Strantz relates to a bait fish holder. U.S. Pat. Nos. 4,713,908 and 5,009,026, both to Corbitt, III, relate to a bait guard for a fish hook and fish hook including an improved bait guard with a slider. U.S. Pat. No. 994,927 to Jefferson relates to an artificial bait.

Lastly, note Page 47 of the 1992 Spring Cabela's catalog.

Although each of the known prior art devices advances the technology to one extent or the other, no known fishing device provides the benefits of the present invention in such an sufficient, convenient and economic manner.

Accordingly, it is an object of the present invention to provide a fishing lure for improved securement of the bait to the hook comprising a hook of an essentially rigid material having a central linear portion and having a curved portion at the outboard free portion terminating in a barb at the free end and having an upturned inboard portion terminating in a first eyelet. A head formed of a material having a specific gravity greater than water to allow, when coupled with the hook, the sinking thereof, the head being in an oval shaped configuration and covering that portion of the inboard and central portions of the hook where the inboard portion bends from the central portion. The first eyelet is located at the inboard end of the hook exterior of the head. A generally cylindrical extension extending outboardly from the head along a minor extent of the central portion of the hook, the outboard end of the cylindrical extension terminating in a radial projection to assist in maintaining the bait on the hook in contact with the cylindrical extension of the head. A supplemental eyelet secured with respect to the head between the first eyelet and the cylindrical extension. An elastic member coupling the second eyelet and the curved outboard portion of the hook, the elastic member extending in a line coupling the outboard most extent of the second eyelet and the outboard most extent of the curved portion of the hook.

It is a further object of the present invention to maximize the chances of catching fish.

It is a further object of the present invention to ensure that a properly positioned bait on a hook remains in such proper position.

It is a further object of the present invention to position an elastic member between the curbed portion of a hook and a supplemental eyelet on the lure head to prevent bait from its preset position on the hook.

These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

The invention is defined by the appended claims with its specific embodiments shown in the attached drawings for the purposes of summarizing this invention, the invention may be incorporated into a device for a new and improved fishing lure for improved securement of the bait to the hook comprising a hook of an essentially rigid material having a central linear portion and having a curved portion at the outboard free portion terminating in a barb at the free end and having an upturned inboard portion terminating in a first eyelet. A head is formed of a material having a specific gravity greater than water to allow, when coupled with the hook, the sinking thereof, the head being in an oval shaped configuration and covering that portion of the inboard and central portions of the hook where the inboard portion bends from the central portion. The first eyelet is located at the inboard end of the hook exterior of the head. A generally cylindrical extension extends outboardly from the head along a minor extent of the central portion of the hook, the outboard end of the cylindrical extension terminating in a radial projection to assist in maintaining the bait on the hook in contact with the cylindrical extension of the head. A supplemental eyelet is secured with respect to the head between the first eyelet and the cylindrical extension. An elastic member couples the second eyelet and the curved outboard portion of the hook, the elastic member extending in a line generally parallel to the central extent of the hook and coupling the outboard most extent of the second eyelet and the outboard most extent of the curved portion of the hook, the elastic member being a loop with hair-like members extending outwardly therefrom formed through the cutting of the elastic member from its edge at a slight angle with respect to the central axis of the elastic member, the elastic member and hook defining a zone on the hook for receiving the bait with one end of the bait secured in position against movement by the radial projection on the cylindrical extension and at the other end by the area of contact between the elastic member and the curved portion of the hook.

The foregoing has outlined rather broadly, the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
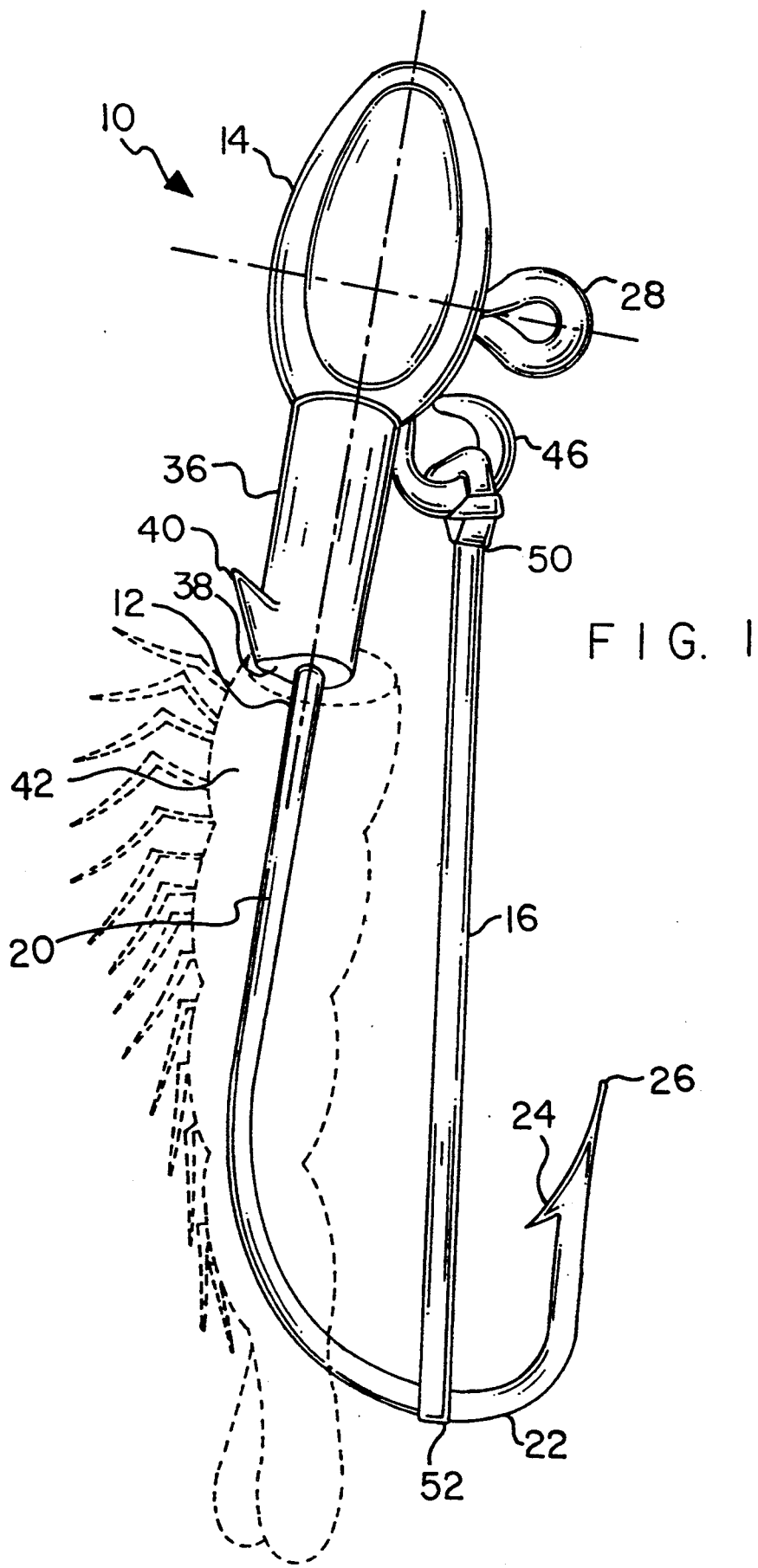
FIG. 1 is a perspective view of the primary embodiment of the fishing jig constructed in accordance with the principles of the present invention.

Shown in the Figures, with particular reference to FIG. 1, there is illustrated a fishing lure or jig. The FIG. 1 showing illustrates the primary embodiment of the invention.

The lure 10 of the primary embodiment includes three major components, a hook 12, a head 14 and an elastic member 16. Such component parts are constructed individually, and are interrelated one with the other, to provide for maximum efficiency of the lure system.

More specifically, the hook 12 is a generally conventional member in that it is made up of an essentially rigid material. It has a central linear portion 20 with a curved portion 22 at the outboard free portion 26. Such outboard portion terminates in a barb 24 at the free end 26.

The hook also has a conventional eyelet 28 at the near end opposite from the free end 26. Unlike conventional hooks, however, the hook 12 of the present invention has an upturned inboard portion 30 extending at an angle from the linear portion 20 whereat a bend 32 is located.

The next major component of the lure 10 is a head 14. The head is formed of a material having a specific gravity which, when coupled with the hook, will effect a specific gravity so as to allow the sinking thereof when fishing in water. The head is in an oval shaped configuration. It is of such size and orientation to cover that portion of the inboard portion 30 and central linear portion 20 of the hook. It also covers the bend 32.

Formed integrally with the head 14 is an extension 36. The extension is of a generally cylindrical configuration. It extends outboardly from the head 14 along a minor extent of the central linear portion 20 of the hook 12. The outboard end 38 of the cylindrical extension 36 terminates in a radial projection 40. Such projection is adapted to spear the adjacent portion of bait 42 located on the linear portion 20 of the hook 12. Such radial projection 40 thus assists in maintaining the bait 42 on the appropriate position of the hook 12.

In association with the head 14 are a pair of eyelets, a first eyelet 28 and a second eyelet 46. The first eyelet 28 is located at the inboard end of the hook 12. It is positioned exterior of the head 14 but in close proximity thereto. A second eyelet 46 is also secured with respect to the head 14. Such second eyelet is secured with respect to the head between the first eyelet 28 and the cylindrical extension 36. It may be formed integrally therewith or coupled thereto. The second eyelet 46 is located about midway between the central linear portion 20 of the hook and the inboard portion 30. This is at about a 45 degree angle between such portions 20 and 30 of the hook.

The last major component of the lure system is an elastic member 16. Such elastic member may be a simple rubber band. It may also be an elastic member specifically designed and fabricated for the purposes of the present invention. The elastic member is adapted to be coupled to the second eyelet by positioning one end of the loop of the elastic member through the second eyelet and then extending the remaining portion of the elastic member through the end pushed through the eyelet. Note the loop 50 at the second eyelet as shown in FIG. 1. The free end 52 of the elastic member 16 is then stretched and positioned over the curved outboard end of the hook 12. The elastic member thus extends in a line generally parallel to the central extent of the hook. Depending on the size of the head 14, the hook 12 and the second eyelet 46, the elastic member may form an angle of up to about 10 degrees with respect to the central portion 20 of the hook. The elastic member thus extends in a line coupling the outboard most end of the second eyelet and the outboard most extent of the curved portion of the hook. This provides for the greatest securement of the elastic member with respect to the hook and second eyelet for maximum retention forces to keep the bait in proper position on the hook.

The elastic member 16 and the hook 12 when coupled as described above, define a zone on the hook for receiving the bait. Such zone is the preferred zone and has one end of the bait, the inboard end secured in position against movement by the radial projection 40 on the cylindrical extension 36 and at the other end by the area of contact between the elastic member 16 and the curved portion 22 of the hook 12.

Figure 2:
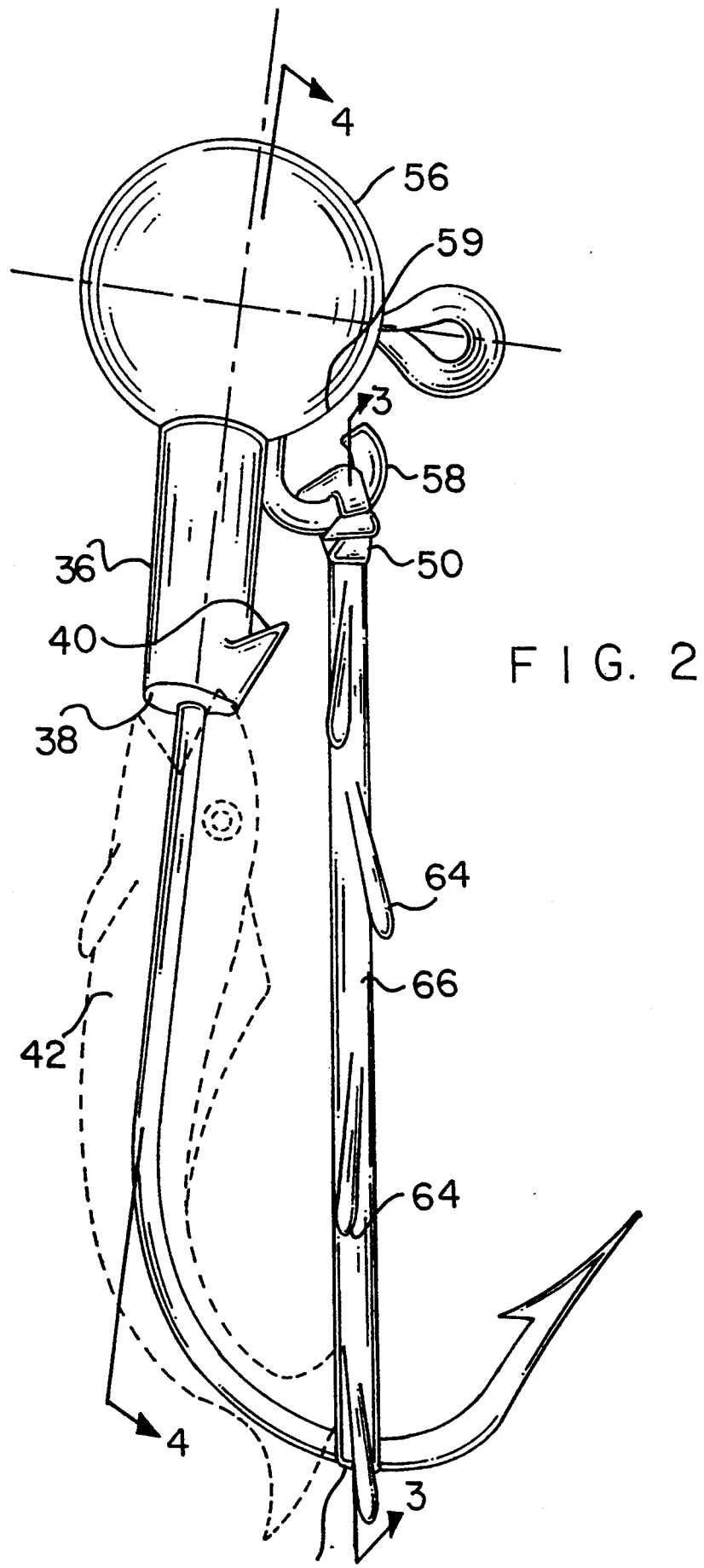
FIG. 2 is a perspective view of the device shown in FIG. 1 but constructed in accordance with an alternate embodiment of the invention.
Figure 7:
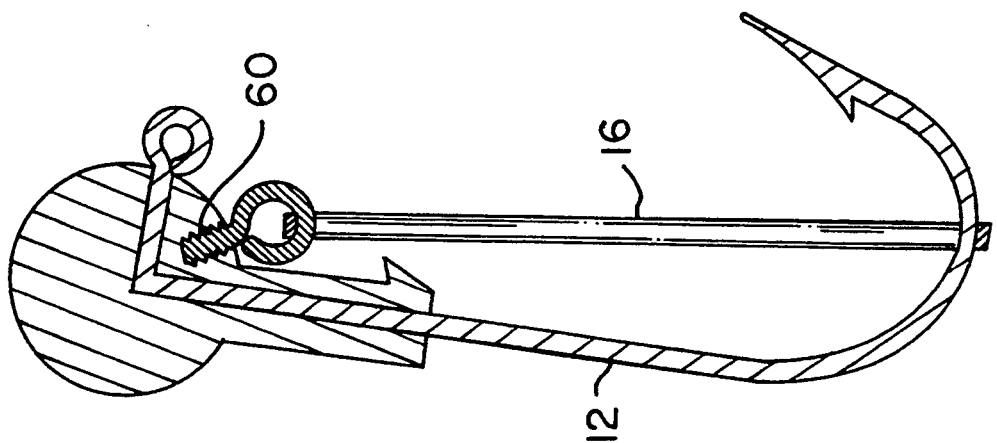
FIGS. 5, 6 and 7 are additional cross sectional views of the head and hook but illustrating additional alternate embodiments of the invention.

An alternate embodiment of the invention is shown in FIG. 2. In such alternate embodiments essentially all of the elements of the lure 10 are as in the primary embodiment of FIG. 1. In such alternate embodiment, however, the head 56 is formed as a sphere rather than in an oval shaped configuration. The sphere has associated therewith a hook 12 as well as a cylindrical extension 36 and a second eyelet 58. The second eyelet 58 of the FIG. 2 embodiment is formed not as a totally closed circular loop but rather in a curve with a free end forming an opening 59 on the side thereof remote from the curved portion 22 of the hook. This allows an elastic member 16 to be positioned on the second eyelet 58 without forming a loop in the elastic member. In either embodiment, the second eyelet may be formed with a screw-like extension 60 for being secured into the head. Note FIG. 7.

Figure 4:
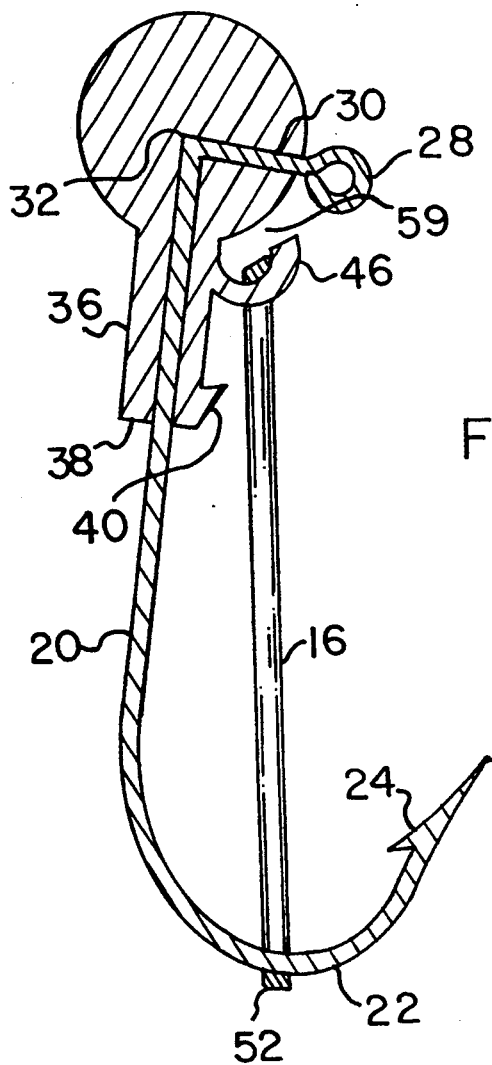
FIG. 4 is a cross sectional view of the head and hook taken along line 4—4 of FIG. 2.
Figure 3:
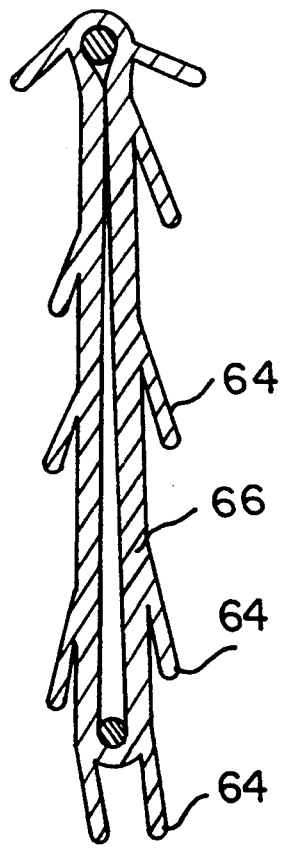
FIG. 3 is a cross sectional view of the elastic member taken along line 3—3 of FIG. 2.

An other feature of the alternate embodiment can be seen by reference to FIGS. 2 and 4. Such feature is the formation of hair-like members 64 fabricated into the elastic member 66. Such alternate elastic member 66 is similar to the elastic member 16 of the primary embodiment. It is formed with cuts in the elastic member to foyer the hair-like members 64. Such cuts are made from the edge of the elastic member inwardly at an angle toward the circumferential center line of the elastic member. Such cutting is at a slight angle from about 1 degree to about 5 degrees with respect to the central axis line of the elastic member. Such cuts when used in association with the lure of the present invention, generate hair-like or worm-like extensions adapted to attract the fish to the bait and hook for increasing the chances of successful fishing.

Figure 5:
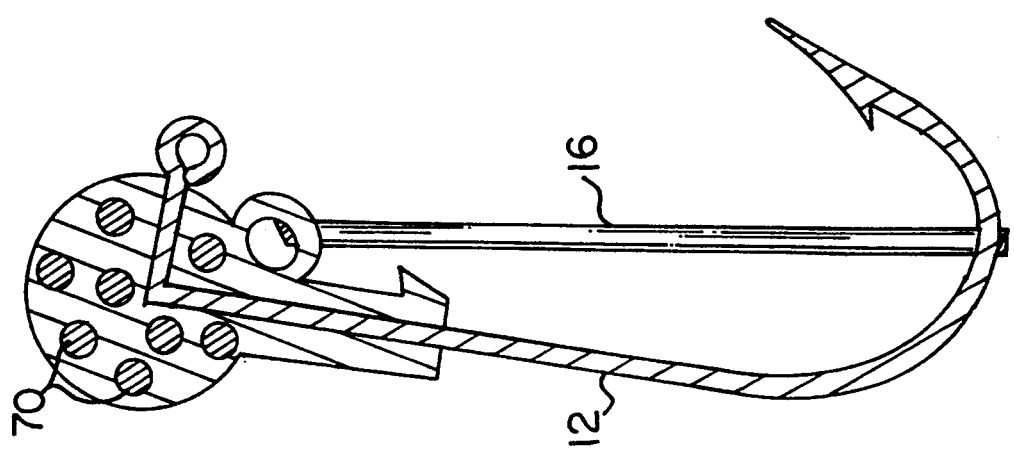

In the FIG. 1 embodiment, the head is fabricated of one piece of metal, as for example, lead. In the FIG. 2 embodiment, the lead is replaced by a rigid elastomeric material. Such material, however, is normally lighter than water and would float. As a result, heavy metal objects 70 in the form of steel balls are added to increase the weight and specific density of the head whereby it will sink in water and not float. Note FIG. 5. In such embodiment, the head and cylindrical extension are fabricated of a plastic selected from the class of non-degradable elastomers including polyurethane and polyesters in a closed cell configuration. The steel shots 70 are embedded therein to increase its specific density to an extent greater than that of water.

Figure 6:
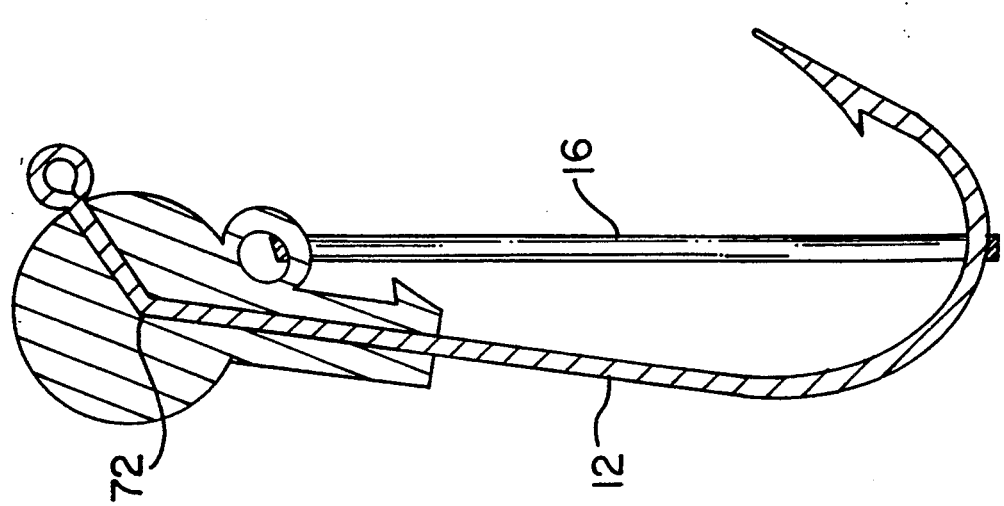

A final alternate embodiment of the invention can be seen by comparing FIGS. 1 and 2 with the FIG. 6 embodiment. In the earlier embodiment, the curve of the hook 14 within the head 12 is at 90 degrees. In the FIG. 6 embodiment, however, the bend 72 is at 120 degrees. This is 60 degrees from the extended axis of the central portion of the hook with respect to the central axis of the upturned extension within the head.

The lure of the present invention is adapted for use in fishing for a large variety of fish and may be used with a large variety of baits in association with a large variety of hook sizes. By way of example, the lure of the present invention could be sized for use with hooks as small as 3/0 up to a 6 size hook. Larger or smaller hooks could of course be employed with corresponding changes in size for the head and other components of the lure. A wide variety of baits could be used from shrimp, mullet strips or the like as well as other types of baits, natural or synthetic. Lastly, the lure of the present invention is adapted to be used for fishing for a large variety of fish from casting, including jigging, whether done at the top surface of the water or any distance beneath the water surface.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A new and improved fishing lure for improved securement of the bait to the hook comprising, in combination:

a hook of an essentially rigid material having a central linear portion and having a curved portion at an outboard end of said linear portion, said curved portion terminating in a barb, and having an upturned inboard portion terminating in a first eyelet, said inboard portion at an inboard end of said linear portion;

a head formed of a material having a specific gravity greater than water to allow, when coupled with the hook, the sinking thereof, the head being in an oval shaped configuration and covering that portion of the inboard and central portions of the hook where the inboard portion bends from the central portion;

the first eyelet being located at the inboard end of the hook exterior of the head;

a generally cylindrical extension extending outboardly from the head along a minor extent of the central portion of the hook, the outboard end of the cylindrical extension terminating in a radial projection to assist in maintaining the bait on the hook in contact with the cylindrical extension of the head;

a second eyelet secured with respect to the head between the first eyelet and the cylindrical extension; and an elastic member coupling the second eyelet and the curved outboard portion of the hook, the elastic member extending in a line generally parallel to the central extent of the hook and coupling the outboard most extent of the second eyelet and the outboard most extent of the curved portion of the hook, the elastic member being a loop with hair-like members extending outwardly therefrom formed through the cutting of the elastic member from its edge at a slight angle with respect to the central axis of the elastic member, the elastic member and hook defining a zone on the hook for receiving the bait with one end of the bait secured in position against movement by the radial projection on the cylindrical extension and at the other end by the area of contact between the elastic member and the curved portion of the hook.

2. A fishing lure for improved securement of the bait to the hook comprising:

a hook of an essentially rigid material having a central linear portion and having a curved portion at an outboard end of said linear portion, said curved portion terminating in a barb, and having an upturned inboard portion terminating in a first eyelet, said inboard portion at an inboard end of said linear portion;

a head formed of a material having a specific gravity greater than water to allow, when coupled with the hook, the sinking thereof, the head comprising an exterior curved shaped configuration and covering that portion of the inboard and central portions of the hook where the inboard portion bends from the central portion;

the first eyelet being located at the inboard end of the hook exterior of the head;

a generally cylindrical extension extending outboardly from the head along a minor extent of the central portion of the hook, the outboard end of the cylindrical extension terminating in a radial projection to assist in maintaining the bait on the hook in contact with the cylindrical extension of the head;

a supplemental eyelet secured with respect to the head between the first eyelet and the cylindrical extension; and an elastic member coupling the second eyelet and the curved outboard portion of the hook, the elastic member extending in a line coupling the outboard most extent of the second eyelet and the outboard most extent of the curved portion of the hook.

3. The lure as set forth in claim 2 wherein the elastic member is a loop with hair-like members extending outwardly therefrom and formed through the cutting of the elastic member from its edge at a slight angle with respect to the central axis of the elastic member.

4. The lure as set forth in claim 2 wherein the elastic member and hook define a zone on the hook for receiving the bait with one end of the bait secured in position against movement by the radial projection on the cylindrical extension and at the other end by the area of contact between the elastic member and the curved portion of the hook.

5. The lure as set forth in claim 2 wherein the head is formed as an oval-shaped member.

6. The lure as set forth in claim 2 wherein the head is formed as an essentially spherical-shaped member.

7. The lure as set forth in claim 2 wherein the angle between the central portion of the hook and the inboard end thereof is essentially 90 degrees.

8. The lure as set forth in claim 2 wherein the angle between the central portion of the hook and the inboard end thereof is essentially 120 degrees.

9. The lure as set forth in claim 2 wherein the head and its cylindrical extension are fabricated of lead.

10. The lure as set forth in claim 2 wherein the head and its cylindrical extension are fabricated of a plastic selected from the class of non-degradable elastomers including polyurethane and polyesters in a closed cell configuration with steel shot embedded therein to increase the specific density of the lure to an extent greater than that of water.

11. The lure as set forth in claim 2, the elastic member adapted to retain the bait in proper position on a hook, the elastic member being formed as a loop with hair-like members extending outwardly therefrom and formed through the cutting of the elastic men, bet from its edge at a slight angle between about one degree and 10 degrees with respect to the central axis and edge of the elastic member.

* * * * *